Feb. 4, 1941.   F. W. BUSH   2,230,742
SPEED CONTROL DEVICE
Filed Nov. 10, 1936   3 Sheets-Sheet 1
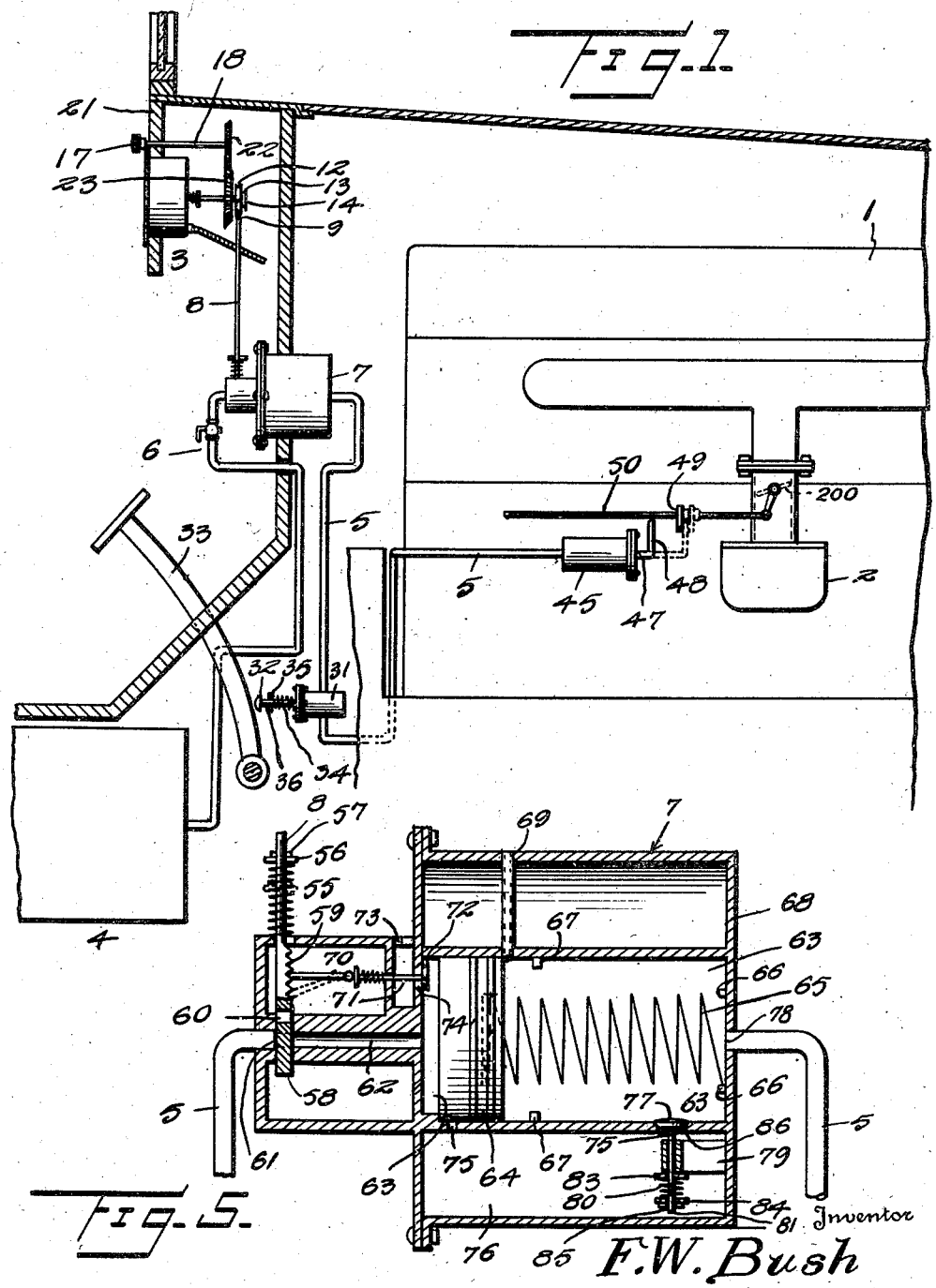

Feb. 4, 1941.　　　　F. W. BUSH　　　　2,230,742
SPEED CONTROL DEVICE
Filed Nov. 10, 1936　　　3 Sheets-Sheet 2
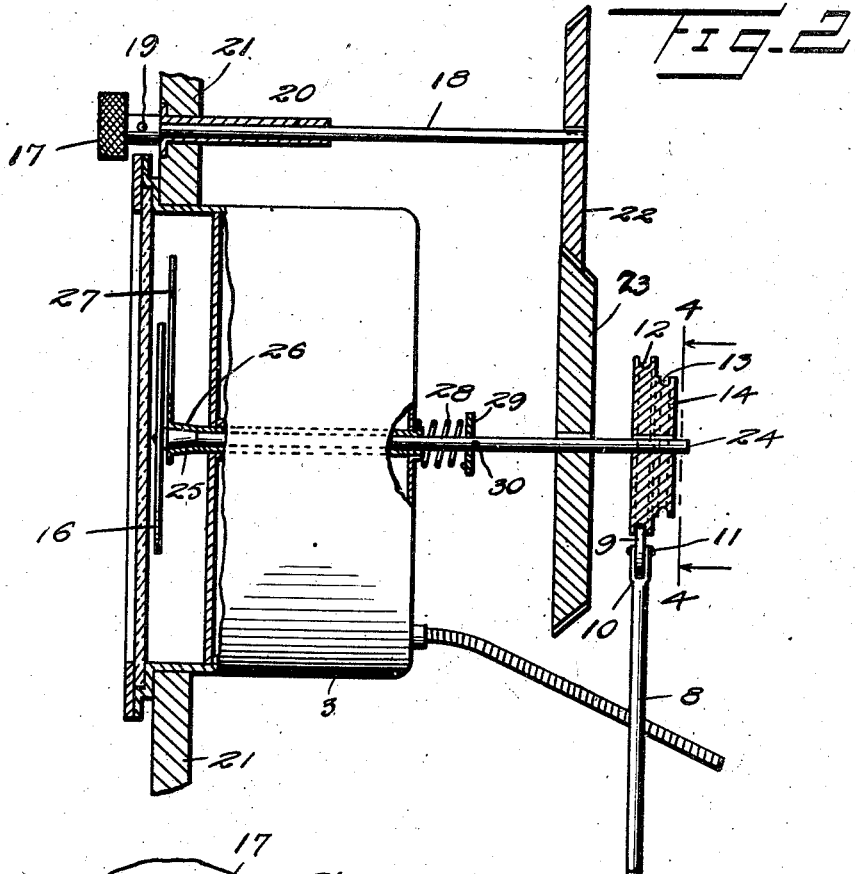
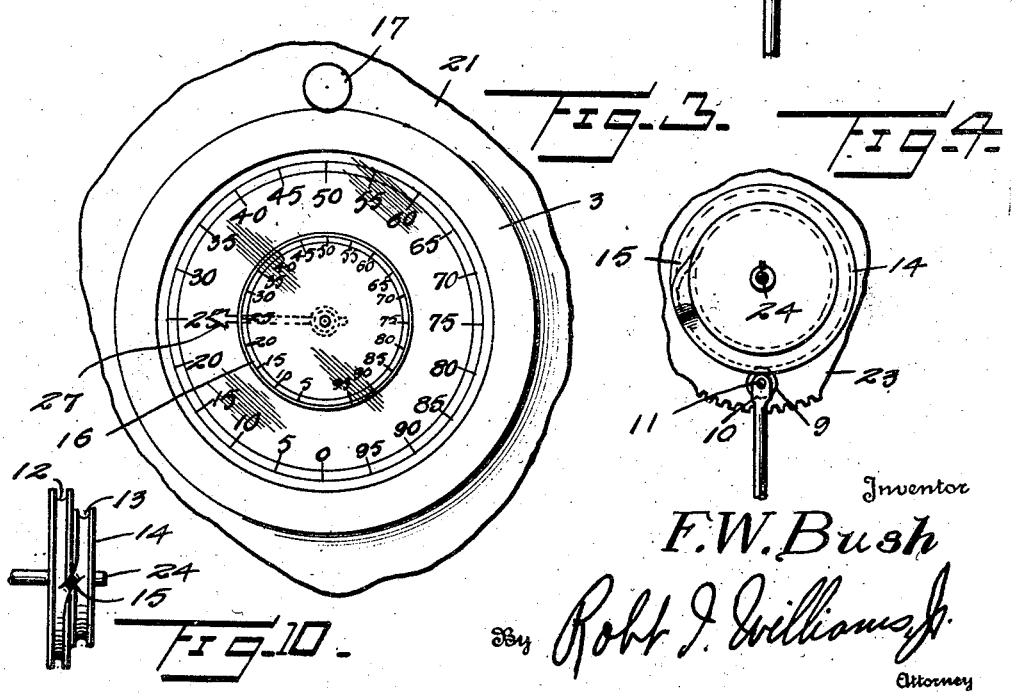
Inventor
F. W. Bush
By Robt. J. Williams Jr.
Attorney Feb. 4, 1941.   F. W. BUSH   2,230,742
SPEED CONTROL DEVICE
Filed Nov. 10, 1936   3 Sheets-Sheet 3
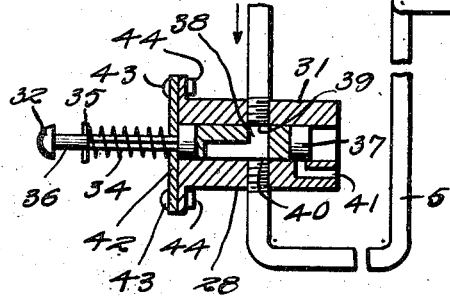
Fig. 6.
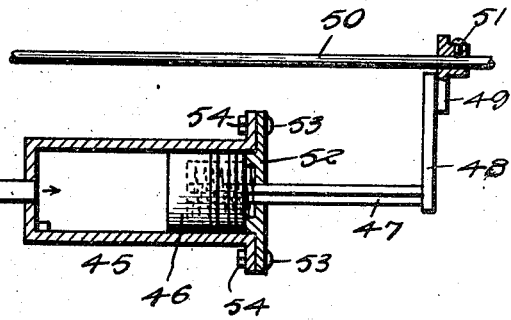
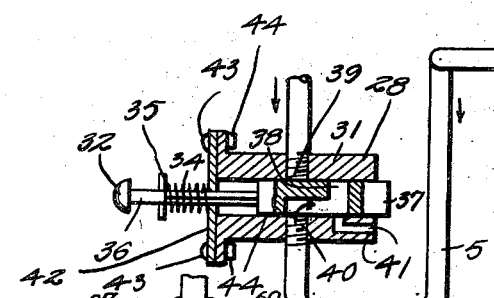
Fig. 7.
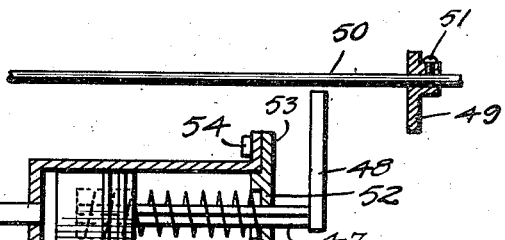
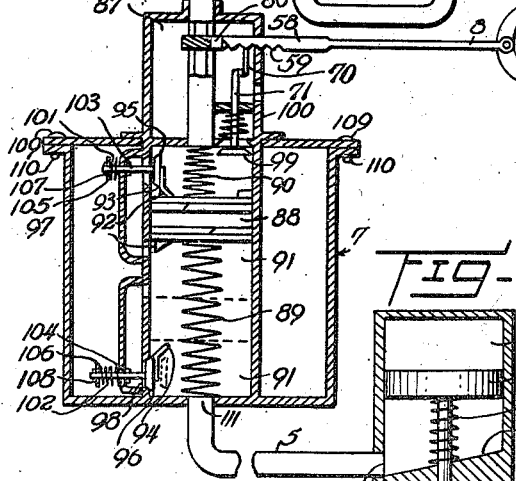
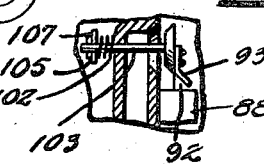
Fig. 8.
Fig. 9.
Inventor
F. W. Bush
Rolf J. Williams J.
Attorney Patented Feb. 4, 1941

2,230,742

UNITED STATES PATENT OFFICE 2,230,742

SPEED CONTROL DEVICE

Floyd W. Bush, Washington, D. C.

Application November 10, 1936, Serial No. 110,171

19 Claims. (Cl. 192—3)

This invention relates to an automatic speed control device for internal combustion engines, the principal object of the invention being to control the flow of gasoline to the carburetor, by the elimination of the use of the accelerator or hand throttle control. In this respect the device functions as a constant speed device, but the invention further provides whereby such constant speed may be varied at any time by the operator. This can be done by depressing the accelerator pedal to increase the rate of speed, or by depressing the brake pedal to decrease the rate of speed. Thus the operator has full control of his vehicle, since the speed can be varied at any time he desires.

One purpose of the present invention is to eliminate the constant use of the foot to control the speed of the car upon long drives.

Another purpose of the present invention is to provide a brake control which will tend to release the speed device upon depressing the brake pedal on rounding curves or upon reducing speed in overtaking traffic.

A further purpose of the invention is to keep the speed constant either upon ascending or descending grades.

The foregoing and other purposes of the invention are obtained in the device illustrated in the accompanying drawings and described below.

Figure 1 is an elevation of an internal combustion engine with the speed control device attached in accordance with the invention.

Figure 2 is an elevation, parts broken away of the usual speedometer with the speed indicator control attached.

Figure 3 is the front view of Figure 2.

Figure 4 is a rear view of Figure 2, taken substantially along line 4—4.

Figure 5 is a detailed view of float valve 7 shown in Figure 1.

Figure 6 is a detailed view of brake control valve 31 and operator 45 in operation.

Figure 7, is a detailed view of brake control valve 31 and operator 45 showing the operation of the valve and operator upon the depressing of the brake pedal.

Figure 8 is a detailed view of a modified construction.

Figure 9 is a detailed section of the valve shown in Figure 8.

Fig. 10 is a side view of double disc 14, showing grooves 12 and 13 and slanted section 15.

The preferred form of the invention as illustrated in the drawings, by use of like characters which are employed to designate corresponding parts throughout, is hereinafter described and claimed.

Referring to the drawings, the numeral 1 designates an internal combustion engine with the usual carburetor 2 having the conventional throttle or butterfly valve 200 and speedometer 3. Suitably attached to the underbody of an automobile by means not shown or described is a storage tank 4 which may be filled with air under pressure from the usual free air hose or from a small compressor which may be attached to the motor and connected to the motor fan belt, not shown. Copper tubing 5 connects the principal elements of the invention; inserted in the tubing below the dash board is a pet cock 6 which can be used to shut off the air from the supply tank when the device is not in operation. Float valve 7 is controlled by a lever 8 with a small wheel 9 inserted in the forked end 10 thereof, running freely on shaft 11. Wheel 9 is adapted to run in the grooves 12 and 13 of a double disc 14 having thereon a slanted portion 15 which is adapted to control the inflow of air to the float valve 7 when indicator 16 is set to any desired speed by means of knob 17, which is held in place on shaft 18 by means of set screw 19. Shaft 18 is held in place by friction in sleeve 20 which is set in the usual control board 21, which is common to all automobiles. Shaft 18 has a bevelled gear 22 attached thereto, which in turn meshes with gear 23 which is attached to a solid shaft 24, upon which is attached indicator 16. Shaft 24 has a cone clutch 25 which is adapted to mesh with hollow shaft 26 upon which is mounted the usual speedometer hand 27 of the speedometer 3. Cone clutch 25 and hollow shaft 26 are kept in contact by pressure of spring 28 which is in turn held in place on shaft 24 by a washer 29 and a pin 30 which is inserted in shaft 24. Float valve 7 is connected to the brake controlled valve 31 by means of the copper tubing 5. Plunger knob 32 is adapted to be contacted by the usual brake pedal 33. Plunger knob 32 is held in open position by spring 34 which is in turn held in place by washer 35. Plunger knob 32 is mounted on shaft 36 at one end. The other end of shaft 36 functions as a slide valve 37, which has duct 38 therein which is adapted to coincide with the inlet 39 and outlet 40 to which is connected copper tubing 5, or with the bleed outlet 41, which bleeds to the atmosphere. Brake control valve 31 is closed at one end by plate 42 which is secured in place by two bolts and nuts 43 and 44 respectively. From brake control valve 31, copper tubing 5 extends to operator 45 which has a spring pressed plunger 46 therein to which is attached shaft 47 having upturned portion 48 adapted to contact a stop 49 which is held in place on the throttle control rod 50 by a small set screw 51. Operator 45 is closed at one end by a plate 52 held in place by bolts and nuts 53 and 54 respectively. The device is controlled by float valve 7 through lever 8 which is kept in closed position by means of spring 55 held in place on lever 8 by washer 56 and pin 57. Lever 8 has flattened end portion 58 which has ratchet teeth 59 formed thereon and port 60 situated therein, said port being adapted to coincide with the inlet 61 at the end of air duct 62 through which the air flows from copper tubing 5 into chamber 63 in which is located a slide valve 64, which is held in position by a spring 65 which is in turn held in place by upraised portion 66. Slide valve 64 is stopped when it moves to the right in the chamber 63 by stops 67. Casing 68 has bleed outlet 69 which allows the air to bleed to the atmosphere when the device is not in operation. Ratchet teeth 59 are in turn contacted by ratchet 70 which is on the end of shaft 71 upon which is mounted bleed valve 72 which seats upon valve seat 74 which also allows the air under pressure to bleed to the atmosphere through outlet 73, thus allowing slide valve 64 to return to its normal position. When air enters chamber 63 it leaves by means of outlet 75 entering chamber 76 forcing valve 77 open, allowing air to enter chamber 63 and outlet 78 into copper tubing 5. Valve 77 is held in place by guide 79 and is held normally closed by spring 80 which is held in place on shaft 81 by means of spring 80 which is set between washers 83 and 84. Washer 84 is held onto shaft 81 by means of pin 85 and valve 77 seats on valve seat 86.

The modification shown in Figure 8 is operated from the usual intake on the internal combustion engine by copper tubing 5, which is connected to and enters chamber 87 of float valve 7. The float valve 7 is also controlled by lever 8 contacting double disc 14, lever 8 having flattened portion 58 and ratchet teeth 59 which are contacted by ratchet 70 on shaft 71. Slide valve 88 is balanced between two flexible springs 89 and 90 respectively in chamber 91. Slide valve 88 has cam members 92 on the top and lower surfaces. Said cam members are adapted to contact projections 93 and 94 on spring valves 95 and 96 which lead into outlets 97 and 98, through which air passes into and out of chamber 91. Air is allowed to bleed through bleed valve 99 and valve seat 100 to control the rise and fall of slide valve 88 in chamber 91. Spring valves 95 and 96 are controlled by springs 101 and 102 respectively, said springs being retained on shafts 103 and 104 by washers 105 and 106 and pins 107 and 108. The float valve is in two parts and is held together by bolts and nuts 109 and 110. To outlet 111 is connected copper tubing 5, which leads to outlet 112 of plunger valve chamber 113, having a spring pressed plunger 114 therein connected to shaft 115 which has a spring 116 which controls plunger 114. Chamber 113 has slanted portion 117 therein, which prevents the plunger 114 from completely closing the outlet 111.

To operate the device, knob 17 is pulled forward by the operator. This action pulls forward gear 22, which in turn by means of bevelled gears pushes or pulls gear 23 forward, releasing the indicator 16, allowing the device to be set at the desired speed by the knob 17. This setting is accomplished by placing the speed desired on the indicator 16 beneath or behind the speedometer hand 27. While the desired speed is being set on the speedometer from "0" on groove 13), wheel 9 is travelling over the slanted portion 15 and is forcing lever 8 downward, allowing port 60 to coincide with the inlet 61 allowing air under pressure to enter from storage tank 4 into chamber 63, forcing float valve 64 to the right allowing air flow out of outlet 75 through chamber 76 forcing open valve 77, allowing the air to pass out outlet 78 to the brake control valve 31 through copper tubing 5 through port or outlet 39 out port or outlet 40 through copper tubing 5 to operator 45, forcing plunger 46 to open the throttle valve 50 by means of upturned portion 48 contacting stop 49 thereby moving stop 49 forward until the speed at which the operator has set his indicator is reached. If, after indicator 16 is set at the desired speed, the speedometer hand 27 drops below the set speed wheel 9 will travel along groove 12 on the larger side of disc 14, and by thus keeping port 60 coinciding with inlet 61 air passes through the system to operator 45 and acts upon throttle valve 50 as above described. When the speedometer hand 27 reaches the set speed, wheel 9 again travels over slanted portion of disc 14 toward the smaller side of disc and if the speedometer hand 27 goes above the set speed wheel 9 passes into groove 13 and runs along this groove thus permitting portion of lever 8 to completely shut off the air from inlet 61 relieving pressure in operator 45 which allows throttle valve 50 to shut off the flow of gas by the operation of a spring in the usual manner. Upon depressing brake pedal 33 which contacts plunger knob 32 the air is allowed thereby to bleed out to the atmosphere through outlet 41 allowing the plunger 46 to return and the speed of the car to reduce. Upon the release of brake pedal 33, the pressure is again allowed to force the plunger 46 forward, thus opening the throttle valve to the desired speed.

The modification is constructed so that the device may be attached to the intake manifold of an internal combustion engine. The device is set in the same manner for the desired speed as previously described. When the lever 8 is forced to the left, suction is created through the tubing 5 drawing valve 88 upward, thus creating a vacuum in plunger valve chamber 113, thereby pulling plunger 114 downward performing the same action as previously described. In the event there is too much air in chamber 113 or in copper tubing 5, it will be drawn out by the valve 88 rising to its full height and opening spring valve 95 to permit this air to pass out. Because of this valve 95 air cannot pass back into the chamber below. If too much air is withdrawn the valve 88 will return to the lower end of the chamber to permit air to pass into the chamber 113. The valve 96 prevents air from flowing backward through this duct so that when intake begins to create a vacuum by means of suction through the inlet 60, the valve 88 will again move upward creating a vacuum in chamber 113. Valve 88 is balanced between two very flexible coil springs in the middle of the chamber 91. While this type of the device might not be as smooth working as the type operated by pressure, this modification indicates that the device may be operated by suction from the intake manifold as well as by air under pressure from a storage tank. Flattened portion 15 is slanted in such a manner that if the automobile starts to decrease its speed such as in climbing a hill, lever 8 will allow more air to enter or a greater suction to be created, and the speed will thus be maintained. If the speed increases, such as on descending a hill, lever 8 will then be allowed to rise and the air pressure or suction will be reduced and the speed thus maintained at the desired rate.

It will appear from the foregoing that by the invention I have provided a device capable of maintaining a constant speed whether descending or ascending hills. This device may be adapted to be attached to any type of internal combustion engine. It may also be adapted to be attached to locomotives, other types of engines used for locomotion, or machinery where constant speed may be an essential or desirable factor wherever air under pressure or suction is available.

Modifications of the invention other than those suggested here may be resorted to without departing from the spirit thereof or the scope of the appended claims.

Having thus described my invention, I claim:

1. A speed device in combination with an internal combustion engine, said speed device being operated by air under pressure with means for containing a supply of said air, and with means for maintaining said internal combustion engine at any desired rate of speed, and means for selecting said rate of speed.

2. A speed device in combination with an internal combustion engine, a float valve for maintaining said internal combustion engine at any desired rate of speed, a brake valve for controlling said speed device, and means for selecting said rate of speed, said means being attached to the shaft of the usual speedometer.

3. A speed device in combination with an internal combustion engine, a float valve said float valve adapted to maintain the internal combustion engine at any desired speed, a brake valve, said brake valve being adapted to be contacted by the brake pedal, an operator having means adapted to contact the throttle valve rod of the usual carburetor, and means for selecting any desired rate of speed.

4. A speed device in combination with an internal combustion engine said device having a float valve, a brake controlled valve, a slide valve and means for setting the device at any desired speed, said means attached to the usual speedometer.

5. A speed device in combination with an internal combustion engine, said speed device comprising a float valve, a brake controlled valve, an operator, a spring pressed plunger in said operator, said plunger having an upturned portion said upturned portion adapted to contact and control the usual throttle rod, said device being operated by air under pressure.

6. A speed device in combination with an internal combustion engine, said device comprising a float valve, a brake controlled valve, an operator, a spring pressed plunger in said operator, said plunger having an upturned portion, said upturned portion adapted to contact and control the usual throttle rod, and means for setting the device at any desired speed, said means attached to the usual speedometer.

7. A speed device in combination with an internal combustion engine, said device comprising a float valve, said float valve comprising means which is adapted to be contacted by a double disc, said disc mounted on a shaft connected to an indicator, said indicator being adapted to set the device at any desired rate of speed.

8. A speed device in combination with an internal combustion engine, said device being operated by suction, said device comprising a float valve for maintaining said internal combustion engine at any desired rate of speed and an indicator attached to the speedometer for setting said device at any desired rate of speed.

9. A speed device in combination with an internal combustion engine, said device being operated by suction, said device comprising a float valve for maintaining said internal combustion engine at any desired rate of speed, a brake control valve adapted to be contacted by the usual brake pedal and an indicator attached to the speedometer for setting the device at any desired rate of speed.

10. A speed device in combination with an internal combustion engine, said device being operated by suction, said device comprising a float valve for maintaining said internal combustion engine at any desired rate of speed, a brake control valve adapted to be contacted by the usual brake pedal, an operator having a spring pressed plunger therein, and in indicator attached to the speedometer for setting said device at any desired rate of speed.

11. A speed device in combination with an internal combustion engine, said device comprising a float valve adapted to maintain said internal combustion engine at any desired rate of speed, said float valve controlled by a slide valve, said slide valve adapted to contact a double disk, said double disk mounted on a shaft, said shaft having an indicator mounted thereon, said indicator adapted to set the device at any desired rate of speed.

12. A speed device in combination with an internal combustion engine, said device comprising a float valve for maintaining the internal combustion engine at any desired rate of speed, said float valve adapted to be controlled by a slide valve, said slide valve having ratchet teeth thereon, said ratchet teeth being adapted to be contacted by a dog mounted on a bleed valve.

13. A speed device in combination with an internal combustion engine, said device comprising a float valve adapted to control the speed of said internal combustion engine, a brake valve, said brake valve comprising a slide valve, said slide valve adapted to be contacted by the usual brake pedal, an operator, said operator having a spring pressed plunger therein, said spring pressed plunger having an upturned portion, said upturned portion adapted to contact a stop mounted on the throttle rod of the carburetor, and an indicator, said indicator being adapted to set the speed device at any desired rate of speed.

14. A speed device in combination with an internal combustion engine, said device comprising a float valve, said float valve adapted to maintain the speed of said internal combustion engine, a brake valve, said brake valve comprising a slide valve adapted to be contacted by the usual brake pedal, an operator, said operator having a spring pressed plunger therein, said spring pressed plunger having an upturned portion thereon, said upturned portion adapted to contact a stop mounted on the throttle valve, an indicator, said indicator mounted on one end of a shaft, said shaft having mounted on the other end thereof a double disk, said double disk adapted to be rotated by means of bevelled gears, said bevelled gears adapted to be rotated by a knob mounted on the dash board.

15. A speed device in combination with an internal combustion engine, said device comprising a float valve, said float valve adapted to maintain the speed of said internal combustion engine, a brake valve, said brake valve comprising a slide valve adapted to be contacted by the usual brake pedal, an operator, said operator having a spring pressed plunger therein, said spring pressed plunger having an upturned portion thereon, said upturned portion adapted to contact a stop mounted on the throttle valve, an indicator, said indicator mounted on one end of a shaft, said shaft having mounted on the other end thereof a double disk, said double disk adapted to be rotated by means of bevelled gears, said bevelled gears adapted to be rotated by a knob mounted on the dash board, said device being adapted to be operated by suction obtained from a connection to the intake manifold of said internal combustion engine.

16. A speed device in combination with an internal combustion engine, said speed device being operated by air under pressure with means for maintaining and for selecting any desired rate of speed, with means for containing a supply of said air, said air under pressure being adapted to be controlled by means contacted by the usual foot brake pedal.

17. A speed device in combination with an internal combustion engine, said speed device having means for maintaining said combustion engine at any desired rate of speed, means connected to the shaft of the usual speedometer for selecting the desired speed, and means for disconnecting said selecting means from the shaft.

18. A speed device in combination with an internal combustion engine comprising means for controlling the speed of said internal combustion engine through the throttle valve, means attached to the shaft of the usual speedometer for selecting any desired speed, and means associated therewith for releasing said selecting means from the shaft.

19. A speed device in combination with an internal combustion engine, said device being operated by suction and comprising means for maintaining said internal combustion engine at any desired rate of speed, means for setting said device at any desired rate of speed, said last said means being attached to the shaft of the usual speedometer, and means associated therewith to release said setting means from the shaft.

FLOYD W. BUSH.